United States Patent
Pismenny et al.

(10) Patent No.: US 11,658,803 B2
(45) Date of Patent: *May 23, 2023

(54) METHOD AND APPARATUS FOR DECRYPTING AND AUTHENTICATING A DATA RECORD

(71) Applicant: Mellanox Technologies, Ltd., Yokneam (IL)

(72) Inventors: Boris Pismenny, Haifa (IL); Liran Liss, Misgav Am (IL); Ilya Lesokhin, Ein Ha'Shofet (IL)

(73) Assignee: Mellanox Technologies, Ltd., Yokneam (IL)

( * ) Notice: Subject to any disclaimer, the term of this patent is extended or adjusted under 35 U.S.C. 154(b) by 147 days.

This patent is subject to a terminal disclaimer.

(21) Appl. No.: 17/198,889

(22) Filed: Mar. 11, 2021

(65) Prior Publication Data

US 2021/0203479 A1 Jul. 1, 2021

Related U.S. Application Data

(63) Continuation of application No. 15/945,817, filed on Apr. 5, 2018, now Pat. No. 10,979,212.

(Continued)

(51) Int. Cl.
*H04L 9/06* (2006.01)
*H04L 9/32* (2006.01)

(52) U.S. Cl.
CPC .............. *H04L 9/0637* (2013.01); *H04L 9/32* (2013.01); *H04L 9/3242* (2013.01)

(58) Field of Classification Search
CPC ........ H04L 9/0637; H04L 9/3242; H04L 9/32
See application file for complete search history.

(56) References Cited

U.S. PATENT DOCUMENTS 10,979,212 B2   4/2021  Pismenny et al.
2004/0039908 A1* 2/2004  Rose ..................... H04L 9/0637
                                                           713/168

(Continued)

FOREIGN PATENT DOCUMENTS

WO    WO 2015/055101 A1    4/2015

OTHER PUBLICATIONS

Dierks et al., "The Transport Layer Security (TLS) Protocaol Version 1.2" [online] [retrieved May 25, 2018]. Retrieved from the Internet:<URL: https://tools.ietf.org/html/rfc5246.html>, (dated Aug. 2008).

(Continued)

*Primary Examiner* — Philip J Chea
*Assistant Examiner* — Sangseok Park
(74) *Attorney, Agent, or Firm* — Moore & Van Allen PLLC; Michael M. McCraw

(57) ABSTRACT

A method, apparatus, and computer program product for processing a data record including encrypted and decrypted data is described. Various embodiments include receiving a data record including ciphertext and plaintext blocks and determining whether each block in the data record is a ciphertext block or a plaintext block. If a block is a ciphertext block, the ciphertext block is stored into a ciphertext record, decrypted into a plaintext block utilizing a decryption algorithm, and stored in a plaintext record. If the block is a plaintext block, the plaintext block is stored into the plaintext record, encrypted into a ciphertext block utilizing an encryption algorithm, and stored in the ciphertext record. Embodiments described also include authenticating the data record by passing each block of the ciphertext record to an authentication scheme and outputting the plaintext record to a destination application.

20 Claims, 7 Drawing Sheets

Related U.S. Application Data

(60) Provisional application No. 62/574,302, filed on Oct. 19, 2017.

(56) References Cited

U.S. PATENT DOCUMENTS

| | | |
|---|---|---|
| 2010/0293377 A1 | 11/2010 | Tardo |
| 2016/0277373 A1* | 9/2016 | Murray ................ H04L 9/0637 |
| 2017/0346624 A1 | 11/2017 | Choi et al. |

OTHER PUBLICATIONS

Okmianski "Transmission of Syslog Messages over UDP" [online] [retrieved May 25, 2018], Retrieved from the Internet:URL:https://tools.ietf.org/html/rfc5426>. (dated Aug. 2008).
Salowey et al. "AES Galois Counter Mode (GCM) Cipher Suites for TLS" [online] [retrieved May 25, 2018]. Retrieved from the Interent:<URL:https://tools.ietf.org/html/rfc5288>, (dated Aug. 2008).
Non-Final Rejection for U.S. Appl. No. 15/945,817, dated Dec. 23, 2019, 21 pages.

* cited by examiner

METHOD AND APPARATUS FOR DECRYPTING AND AUTHENTICATING A DATA RECORD

CROSS REFERENCE TO RELATED APPLICATIONS

This application is a continuation of U.S. application Ser. No. 15/945,817, filed Apr. 5, 2018, which claims priority to U.S. Provisional Application No. 62/574,302 filed Oct. 19, 2017, which applications are incorporated by reference herein in their entirety.

TECHNOLOGICAL FIELD

Embodiments of the present invention relate generally to processing a data record including encrypted and decrypted data.

BACKGROUND

This present invention relates to the reception and handling of data records in the transport layer security (TLS) layer where the data records may include both encrypted and decrypted data which must be processed for decryption and authentication before the data record can be sent to a software application.

BRIEF SUMMARY

Embodiments of the present invention include a method, apparatus, and computer program product for processing a partially decrypted data record including encrypted and decrypted data. In one embodiment, with reference to the claimed method, a method for processing a data record including encrypted and decrypted data is provided. The method may include receiving a data record comprising ciphertext and plaintext blocks and determining whether each block in the data record is a ciphertext block or a plaintext block. Upon determining a block is a ciphertext block, the method may include storing the determined ciphertext block into a ciphertext record, decrypting the determined ciphertext block into a plaintext block utilizing a decryption algorithm, and storing the decrypted plaintext block in a plaintext record. Upon determining a block is a plaintext block, the method may include storing the determined plaintext block into the plaintext record, encrypting the determined plaintext block into a ciphertext block utilizing an encryption algorithm, and storing the encrypted ciphertext block in the ciphertext record. The method may further include authenticating the data record by passing each block of the ciphertext record to an authentication scheme and outputting the plaintext record to a destination application.

In some embodiments, the method may further include generating an encrypted counter stream and generating a block indication vector including an indication of an encryption status of each block of the data record. In such an embodiment, determining whether each block in the data record is a ciphertext block or a plaintext block may include using the block indication vector to determine if the block is a ciphertext block or a plaintext block.

In some further embodiments, decrypting the determined ciphertext block into the decrypted plaintext block utilizing the decryption algorithm may include determining the counter number for the determined ciphertext block, and decrypting the determined ciphertext block into the decrypted plaintext block by executing an exclusive disjunction (XOR) operation using the determined counter number. In such an embodiment, encrypting the determined plaintext block into the encrypted ciphertext block utilizing the encryption algorithm may include determining the counter number for the determined plaintext block, and encrypting the determined plaintext block into the encrypted ciphertext block by executing the XOR operation using the determined counter number.

In some embodiments, the method includes a single pass decryption and authentication method. In other embodiments, the authentication scheme utilizes an Advanced Encryption Standard-Galois/Counter Mode calculation.

In other embodiments, decrypting the determined ciphertext block into a plaintext block utilizing a decryption algorithm may include processing the ciphertext block utilizing a cipher block function and decrypting the processed ciphertext block into the decrypted plaintext block by executing an exclusive disjunction (XOR) operation using data from a preceding ciphertext block. In such an embodiment, encrypting the determined plaintext block into the encrypted ciphertext block utilizing the encryption algorithm includes processing the determined plaintext block by executing the XOR operation using data from a preceding plaintext block and encrypting the determined plaintext block into the encrypted ciphertext block by processing the plaintext block utilizing the cipher block function.

In some cases, each block in the data record may include a single byte or sixteen bytes.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
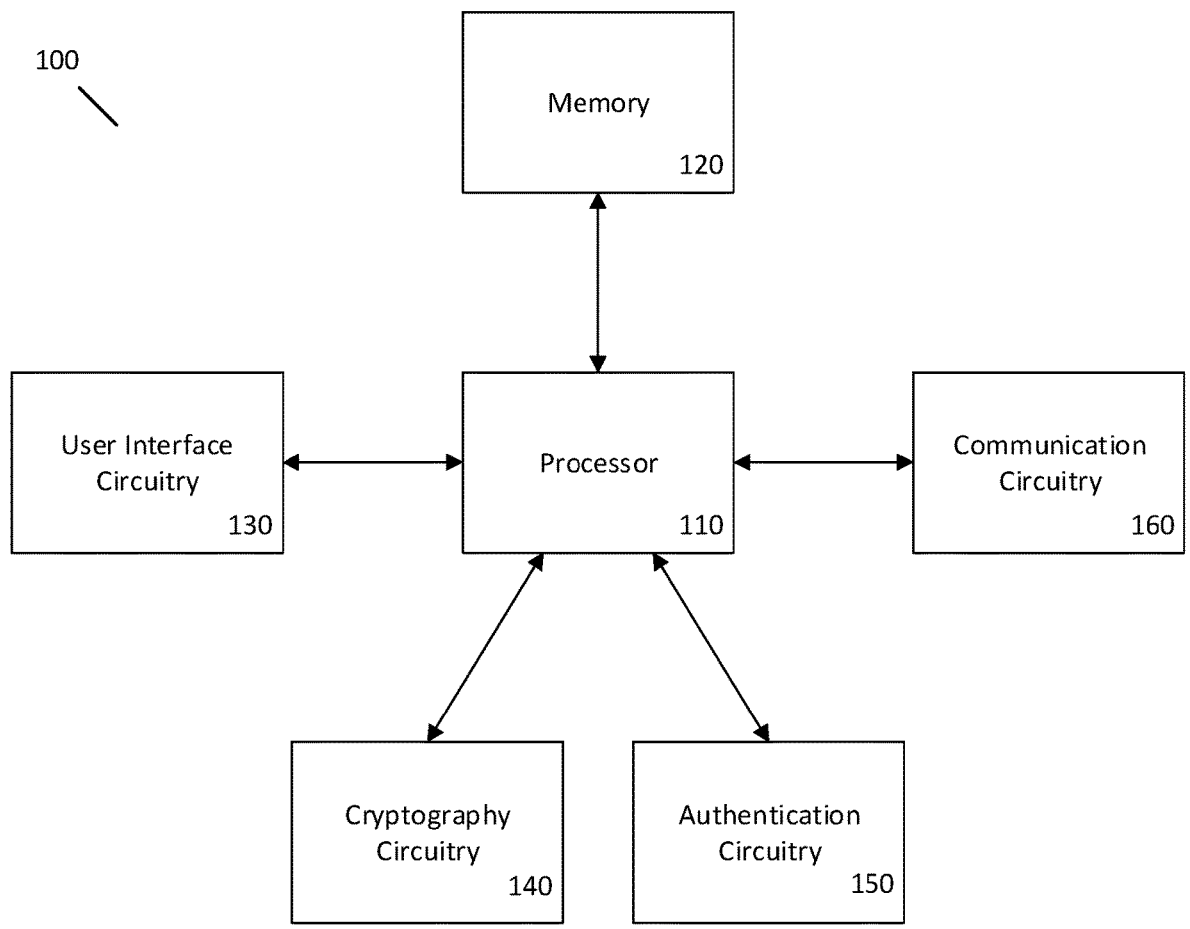
Figure 2:
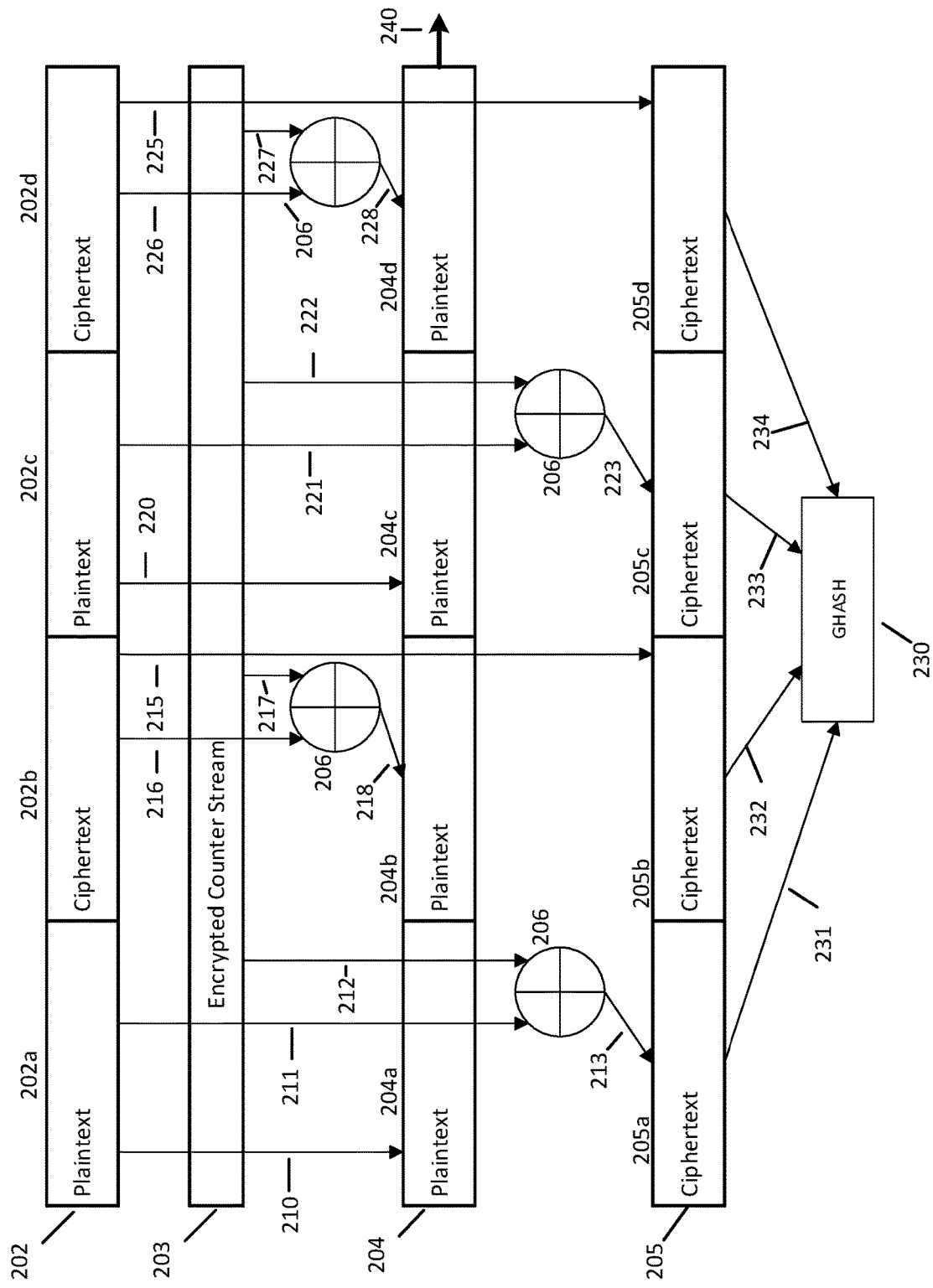
Figure 3:
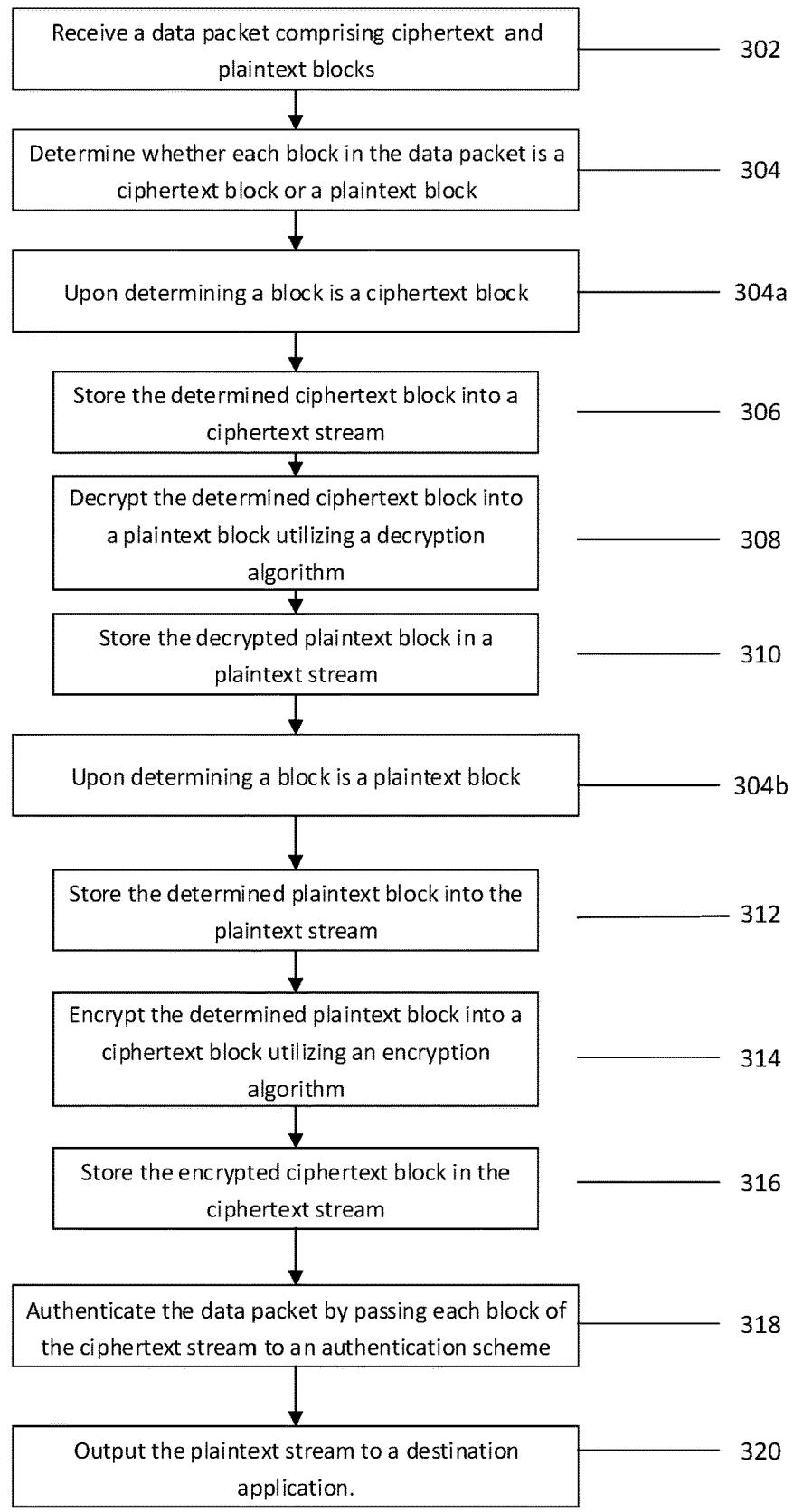
Figure 4:
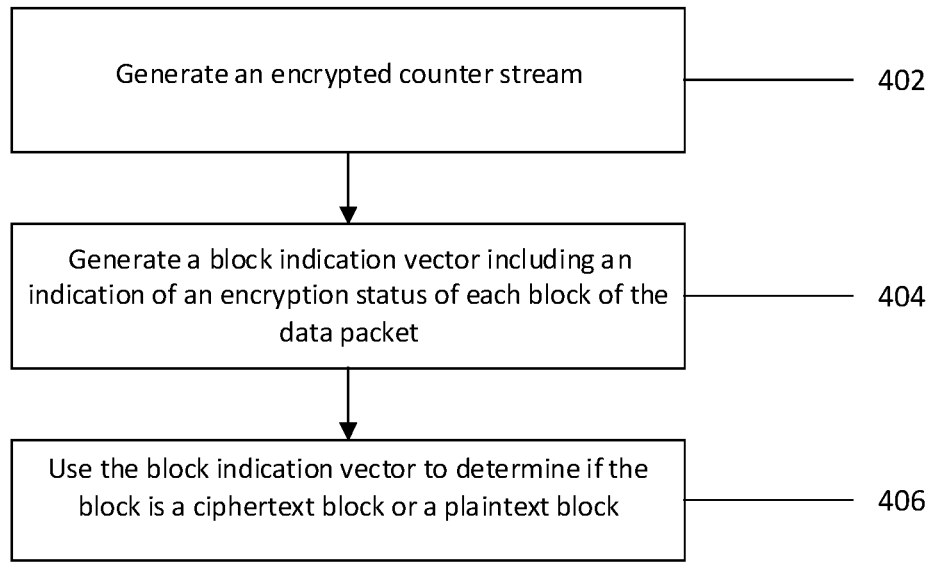
Figure 5:
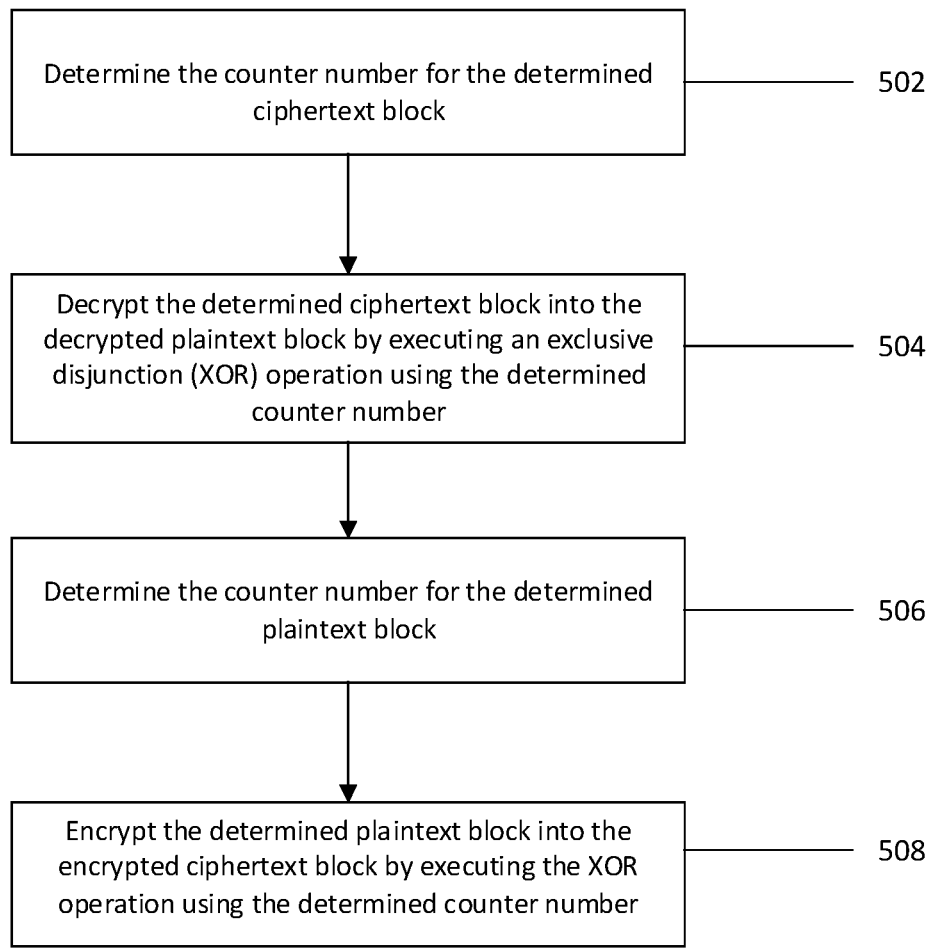
Figure 6:
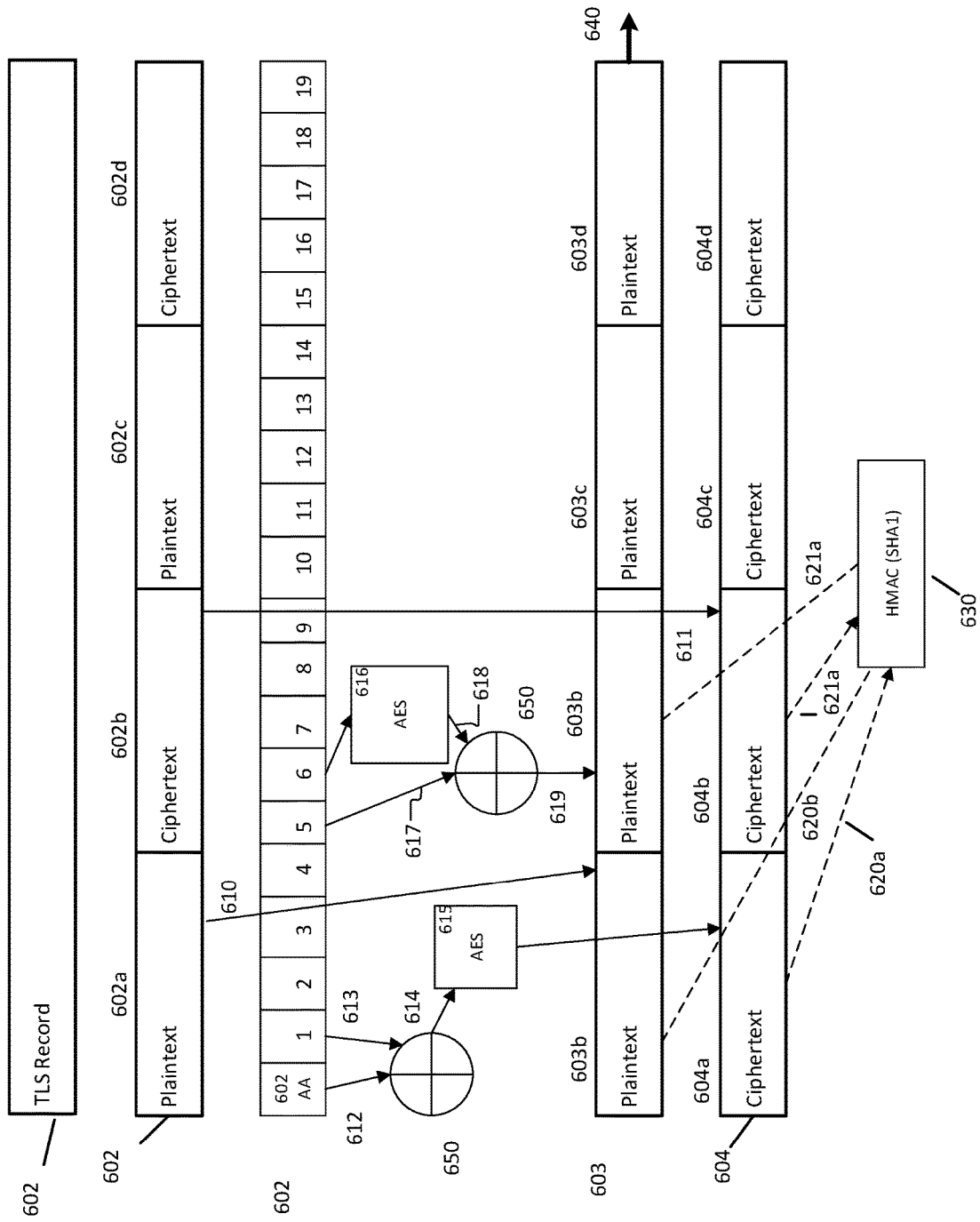
Figure 7:
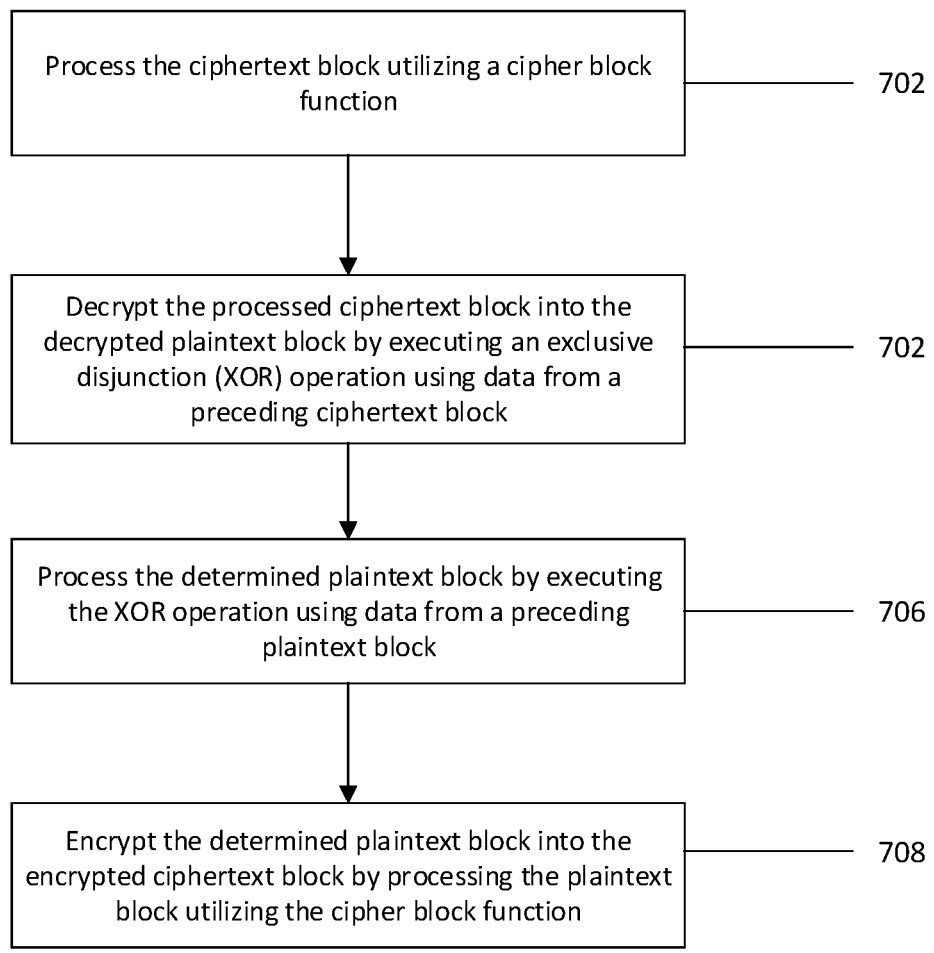

Having thus described embodiments of the invention in general terms, reference will now be made to the accompanying drawings, which are not necessarily drawn to scale, and wherein:

FIG. 1 illustrates a block diagram of an example apparatus for processing a data record including encrypted and decrypted data;

FIG. 2 illustrates an example flow diagram for processing a data record including encrypted and decrypted data;

FIG. 3 is a flowchart illustrating an example method for processing a data record including encrypted and decrypted data;

FIGS. 4, 5, and 7 are flowcharts illustrating additional example methods for processing a data record including encrypted and decrypted data; and FIG. 6 illustrates an additional example flow diagram for processing a data record including encrypted and decrypted data.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "data record," "data stream," "content," "information," and similar terms may be used interchangeably, according to some example embodiments, to refer to data capable of being transmitted, received, operated on, processed, and/or stored. Moreover, the term "exemplary," as may be used herein, is not provided to convey any qualitative assessment, but instead merely to convey an illustration of an example. Thus, use of any such terms should not be taken to limit the spirit and scope of embodiments of the present invention.

Conventional offloading of data records from network hardware such as an FPGA (field programmable gate array) relies on hardware decrypting any encrypted data records and authenticating the encrypted data records. In some cases, network hardware may deliver partially decrypted data records or data records containing both ciphertext and plaintext blocks. This creates both an authentication and decryption problem because a network layer such as a TLS (transport layer security) will then have to resolve the partially decrypted packets composing a TLS record (a data record), in order to deliver decrypted and authenticated plaintext packets to an application or software. For example, if a network interface card (NIC) with stream processing hardware is utilized, some received packets may not be processed due to insufficient hardware capabilities. For instance, internet protocol (IP) packets that arrive out-of-order may not be processed and thus may not be decrypted, authenticated, and delivered to an application.

FIG. 1 illustrates a block diagram of an example apparatus 100 for processing a data record including encrypted and decrypted data. The apparatus of FIG. 1 may be incorporated into or embodied by a computing device that includes a display for displaying various conditions of a data record and/or processing of the data record. For example, the apparatus may be embodied by a mobile computing device or a fixed computing device that includes the display. Alternatively, the apparatus may be separate from the computing device or at least separate from the display that is associated with the computing device, but the apparatus of this embodiment may be in communication with the computing device through wired or wireless communication methods, in order to present a visual representation of the conditions of a data record and/or process the data record. For example, a visual error message, such as a fatal alert described in Internet Engineering Task Force Request for Comments (IETF RFC) 5246 (e.g., bad_record_mac and decrypt_fail) may be presented by the display.

Additionally, while FIG. 1 illustrates one example of a configuration of an apparatus 100 for processing of the data record, other configurations may also be used to implement example embodiments described herein. In the depicted embodiments, separate components or circuitry of the apparatus 100 are shown as being in communication with each other, however, it should be understood that the components and circuitry illustrated may be embodied within the same device or element and thus the components or circuitry of the apparatus 100 shown as being in communication should be understood to alternatively be components of the same device or element.

The apparatus 100 may include or otherwise be in communication with a processor 110, memory circuitry 120, communication circuitry 160, user interface circuitry 130, cryptography circuitry 140, and/or authentication circuitry 150. In some embodiments, the processor 110 (which may include multiple or co-processors or any other processing circuitry associated with the processor) may be in communication with the memory circuitry 120. The memory circuitry 120 may comprise non-transitory memory circuitry and may include one or more volatile and/or non-volatile memories. In some examples, the memory circuitry 120 may be an electronic storage device (e.g., a computer readable storage medium) comprising gates configured to store data (e.g., blocks) that may be retrievable by the processor 110. The memory circuitry 120 may also be configured to store information, data, content, applications, computer program instructions (or computer program code) or the like for enabling the apparatus to carry out various functions or methods in accordance with the example embodiment of the present invention, described herein.

As described above, the apparatus 100 may be embodied by a computing device, such as a mobile terminal or a fixed computing device. In some embodiments, the apparatus may be embodied as a chip or chip set. For example, the apparatus may comprise one or more physical packages (e.g., chips) including materials, components, and/or wires on a structural assembly.

In some examples, the processor 110 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 110 may also be embodied on various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading.

In an example embodiment, the processor 110 may be configured to execute instructions, such as computer program code or instructions, stored in the memory circuitry 120 or otherwise accessible to the processor 110. Alternatively or additionally, the processor 110 may be configured to execute hard-coded functionality. As such, whether configured by hardware or software instructions, or by a combination thereof, the processor 110 may represent a computing entity (e.g., physically embodied in circuitry) configured to perform operations according to an embodiment of the present invention described herein. For example, when the processor 110 is embodied as an ASIC, FPGA, or similar, the processor may be configured as hardware for conducting the operations of an embodiment of the invention. Alternatively, when the processor 110 is embodied to execute software or computer program instructions, the instructions may specifically configure the processor 110 to perform the algorithms and/or operations described herein when the instructions are executed. However, in some cases, the processor 110 may be a processor of a device (e.g., a mobile terminal or a fixed computing device) specifically configured to employ an embodiment of the present invention by further configuration of the processor by instructions for performing the algorithms and/or operations described herein. The processor 110 may further include a clock, an arithmetic logic unit (ALU) and logic gates configured to support operation of the processor 110, among other things.

In some embodiments, the communication circuitry 160 may be a device or circuitry embodied in either hardware or a combination of hardware and software that is configured to receive and/or transmit data from/to a network, network hardware, or network layer, and/or any other device or module in communication with the apparatus 100, such as the computing device that includes or is otherwise associated with the display. In this regard, the communication circuitry 160 may include, for example, an antenna and supporting hardware and/or software for enabling communications with a wireless communication network. In some examples, the communication circuitry 160 may alternatively or also support wired communication. As such, for example, the communication interface may include a communication modem and/or other hardware/software for supporting communication via cable, universal serial bus (USB), digital subscriber line (DSL), or other mechanisms. In some examples, the communication circuitry 160 may be in communication with a NIC which delivers partially decrypted packets to the apparatus 100.

In some embodiments, the user interface circuitry 130 is in communication with the processor 110 to provide output to a user and, in some embodiments, to receive a user input. For example, the user interface circuitry 130 may be configured to communicate with the display and, in some embodiments, may also may be configured to communicate with a keyboard, a mouse, one or more microphones, a speaker, or other input/output mechanisms. In one embodiment, the user interface may include the display upon which visual representation(s) are presented. The processor 110 and/or user interface circuitry 130 may further be configured to control one or more functions of one or more user interface elements through computer program instructions (e.g., software and/or firmware) stored on the memory circuitry 120.

In some embodiments, the cryptography circuitry 140 is in communication with the processor 110 to enable or otherwise provide the functions of the methods described herein for processing a data record including encrypted and decrypted data.

FIG. 2 illustrates an example flow diagram for processing a data record including encrypted and decrypted data. For example, an apparatus such as the apparatus 100 may receive a data record such as a TLS record 202 from a hardware layer containing blocks 202a-202d. In some examples each block in the TLS record 202 comprises a single byte of data. In some examples, each block in the TLS record 202 comprises sixteen bytes of data. In another example, each block of the TLS record 202 may comprise a packet of data.

In some examples, the processing of the data record 202 occurs in a Transport Layer Security (TLS) layer. As illustrated, some of the blocks 202a and 202c may be plaintext blocks or decrypted blocks and some of the blocks 202b and 202d may be ciphertext or encrypted blocks. As described below in relation to FIGS. 3-5, the apparatus 100 may be configured to encrypt the plaintext blocks 202a and 202c into encrypted or ciphertext blocks 205a and 205c using an encryption/decryption algorithm, such as an exclusive disjunction (XOR) operation 206. The XOR operation 206 can be used along with an encrypted counter stream 203 to both encrypt and decrypted blocks.

While the operations discussed herein in relation to FIGS. 2-5 are generally discussed in terms of Advanced Encryption Standard-Galois/Counter Mode (AES-GCM) and an encrypted counter, the operations may also be implemented by other ciphers which are not based on a counter mode or an encrypted counter stream (encrypted keystream). For example, utilizing AES-Cipher Block Chaining (CBC)-hash message authentication code (e.g., HMAC(SHA1)) may comprise processing each plaintext block (of 16 bytes) by executing an XOR function with a previous ciphertext block (of 16 bytes) (as further discussed in relation to FIG. 7). In this example, the plaintext block (such as plaintext block 202c) may contain plaintext with the exception of some ciphertext data in a specific portion of the block, such as in metadata portions of the packet. The plaintext block may then be encrypted with the cipher block function (AES) to produce the corresponding ciphertext block. For example, as shown in FIG. 6, an apparatus such as the apparatus 100 may receive a data record such as a TLS record 602 from a hardware layer containing blocks 602a-602d. In some examples, each block in the TLS record 202 may comprise sub blocks such as sub blocks 1-19 as shown in FIG. 6.

The operations 610, 612, 613, 614, 615, 616, 617, 618, 619, 620, and 621 illustrate the various process flows for encrypting and/or decrypting each block from the received TLS record 602 into the plaintext record 603 and the ciphertext record 604 and for passing the ciphertext record 604 for processing in an authentication scheme 630. In some examples, the authentication scheme may use an keyed-hash message authentication code calculation Secure Hash Algorithm 1 (HMAC-SHA1) to authenticate the ciphertext blocks and in turn the TLS record 602. In another example, the plaintext record 603 may be passed to the authentication scheme 603 to authenticate the TLS record 602. The plaintext record 603 may then be passed as output 640 to a destination application. In some examples, the plaintext and ciphertext blocks may be stored as part of the metadata for each TLS record and delivered to an application upon authentication.

In some examples, packet payload may not be aligned to a cipher block size (e.g., 16 bytes for AES). Thus, in such an example, each packet (e.g., block 602a) will provide its first block size (e.g., 16 for AES) bytes and last block size (e.g., 16 for AES) bytes of ciphertext, even if the rest of the packet payload is decrypted. This metadata may then be used to align the payload to the cipher's block size (e.g., 16 for AES).

For example, as shown in FIG. 6, the sub block 4 is split between blocks 602a and 602b, where the block 602a is plaintext and the block 602b is ciphertext. The block 602a's metadata (602AA) in this example will contain the first few bytes of ciphertext from the block 5 as metadata. Block 602b, which was not processed, does not need to carry metadata. As another example, block 602c may include the last ciphertext bytes of sub block 10 as metadata when the sub block 10 is split between the blocks 602b and 602c. In this example, the rest of the ciphertext of sub block 10 is present at the block 602b.

Referring back to FIG. 2, the encrypted counter stream 203 may be configured to assign and track counter numbers for each block in the TLS record 202 and input the counter number into the XOR operation 206, which enables the apparatus to both encrypt and/or decrypt the data in each block.

In some examples, a 16 byte number (counter) is encrypted using an AES engine, the output is 16 bytes of the encrypted counter stream. The counter is then incremented and encrypted to get the next 16 byte block of the encrypted counter stream. In some examples, the counter is constructed according to RFC 5288.

The operations 210, 211, 212, 213, 215, 216, 217, 218, 220, 221, 222, 223, 225, 226, 227, and 228 illustrate the various process flows for encrypting and/or decrypting each block from the received TLS record 202 into the plaintext record 204 and the ciphertext record 205 and for passing the ciphertext record 205 for processing in an authentication scheme 230. In some examples, the authentication scheme uses an (AES-GCM) calculation to authenticate the ciphertext blocks. The plaintext record 204 may then be passed as output 240 to a destination application. In some examples, the plaintext and ciphertext blocks are stored as part of the metadata for each TLS record and delivered to an application upon authentication.

FIG. 3 is a flowchart illustrating an example method for processing a data record including encrypted and decrypted data. The operations performed, such as by the apparatus 100 of FIG. 1, in accordance with an example embodiment of the method are illustrated. In some examples, the operations described in relation to FIG. 3 are completed in a single pass over the data record, providing a single pass decryption and authentication method. As shown in block 302, the apparatus 100, including the processor 110 and communication circuitry 160, may be configured to receive a data record comprising ciphertext and plaintext blocks, such as TLS record 202 as shown in FIG. 2.

As shown in block 304, the apparatus 100, including the processor 110 and the cryptography circuitry 140 of FIG. 1, may be configured to determine whether each block, such as blocks 202a-202d in the TLS record 202 of FIG. 2, is a ciphertext block (e.g., blocks 202b and 202d) or a plaintext block (e.g. blocks 202a or 202c). This step is described in more detail in relation to FIG. 4.

If the cryptography circuitry 140 determines a block is a ciphertext block as shown in block 304a, the cryptography circuitry 140 may be configured to perform the steps shown in blocks 306-310 of FIG. 3. As shown in block 306, the apparatus 100, including the processor 110 and cryptography circuitry 140, may be configured to store the determined ciphertext block into a ciphertext record. For example, as shown in the operation 215 of FIG. 2 and operation 611 in FIG. 6, the cryptography circuitry 140 may be configured to store ciphertext block 202b into ciphertext record 205 as ciphertext block 205b.

As shown in block 308, the apparatus 100, including the processor 110 and the cryptography circuitry 140, may be configured to decrypt the determined ciphertext block into a plaintext block utilizing a decryption algorithm. For example, as shown by the operations 216 and 217 in FIG. 2, cryptography circuitry 140 may decrypt the block ciphertext block 202b into plaintext block 204b using a decryption algorithm such as the XOR operation 206.

As shown in block 310 of FIG. 3, the apparatus 100, including the processor 110 and the cryptography circuitry 140 of FIG. 1, may be configured to store the decrypted plaintext block in a plaintext record. For example, as shown by operation 218 in FIG. 2 and operation 619 in FIG. 6, the cryptography circuitry 140 may store the output of the XOR operation 206 as plaintext block 204b.

If the cryptography circuitry 140 determines a block is a plaintext block as shown in block 304b, the cryptography circuitry 140 may be configured to perform the steps shown in blocks 312-316 of FIG. 3. As shown in block 312, the apparatus 100, including the processor 110 and the cryptography circuitry 140, may be configured to store the determined plaintext block into the plaintext record. For example, as shown by operation 210 in FIG. 2 operation 610 in FIG. 6, the cryptography circuitry 140 may store the plaintext block 202a into the plaintext record 204.

As shown in block 314 of FIG. 3, the apparatus 100, including the processor 110 and the cryptography circuitry 140 of FIG. 1, may be configured to encrypt the determined plaintext block into a ciphertext block utilizing an encryption algorithm. For example, as shown by operations 211 and 212 in FIG. 2, the cryptography circuitry 140 may encrypt the plaintext block 202a into the ciphertext block 205a using an encryption algorithm such as the XOR operation 206.

As shown in block 316, the apparatus 100, including the processor 110 and the cryptography circuitry 140, may be configured to store the encrypted ciphertext block in the ciphertext record. For example, as shown by operation 213 in FIG. 2 and operation 615 in FIG. 6, the cryptography circuitry 140 may store the output of the XOR operation 206 as ciphertext block 205a.

As shown in block 318 of FIG. 3, the apparatus 100, including the processor 110 and the authentication circuitry 150 of FIG. 1, may be configured to authenticate the data record by passing each block of the ciphertext record to an authentication scheme. For example, as shown by operations 231-234 in FIG. 2, authentication circuitry 150 may be configured to pass the ciphertext blocks 205a-205d to the authentication scheme 230. In some examples, the authentication scheme 230 will output an authentication successful output or an authentication unsuccessful output. In another example, as shown by operations 620a, 620b, 621a, and 621b, in FIG. 6, authentication circuitry 150 may be configured to pass the ciphertext blocks 604a-d or the plaintext blocks 603a-603b to the authentication scheme 630. In some examples, the authentication scheme 230 (or 630) will output an authentication successful output or an authentication unsuccessful output.

As shown in block 320 of FIG. 3, the apparatus 100, including the processor 110 and the communication circuitry 160, may be configured to output the plaintext record to a destination application. For example, the plaintext record may be passed to an application utilizing Hyper Text Transfer Protocol Secure (HTTPS). For example, as shown by output 240 in FIG. 2 or output 640 in FIG. 6, the communication circuitry 160 may be configured to pass the plaintext blocks 204a-204d to an application.

FIG. 4 is a flowchart illustrating an additional example method for processing a data record including encrypted and decrypted data. Specifically, FIG. 4 relates to additional steps for encrypting and/or decrypting the blocks of a data record and determining whether each block in the data record is a ciphertext block or a plaintext block. The operations performed, such as by the apparatus 100 of FIG. 1, in accordance with an example embodiment of the method are illustrated. As shown in block 402 of FIG. 4, the apparatus 100, including the processor 110 and cryptography circuitry 140 of FIG. 1, may be configured to generate an encrypted counter stream, such as the encrypted counter stream 203 as shown in FIG. 2. In some examples, a 16 byte number (counter) is encrypted using an AES engine, and the output is 16 bytes of the encrypted counter stream. The counter is then incremented and encrypted to get the next 16 byte block of the encrypted counter stream. In some examples, the counter is constructed according to RFC 5288.

In some examples, the encrypted counter stream is defined by RFC 5288 (TLS1.2). In some examples, the encrypted counter stream consists of 4 bytes salt (which are persistent per session) concatenated to 8 bytes of explicit packet IV (which are unique per record), and concatenated to a 4 byte counter starting at zero.

As shown in block 404 of FIG. 4, the apparatus 100, including the processor 110 and the cryptography circuitry 140 of FIG. 1, may be configured to generate a block indication vector including an indication of an encryption status of each block of the data record. In some examples, the NIC processes the packet and sets a block as plaintext or ciphertext. The indication on the blocks supplied by the NIC may then be used to generate the block indication vector.

As shown in block 406 of FIG. 4, the apparatus 100, including the processor 110 and the cryptography circuitry 140 of FIG. 1, may be configured to use the block indication vector to determine if the block is a ciphertext block or a plaintext block. For example, the block indication vector may include a "1" for an encrypted block and a "0" for a decrypted block. As an example, block 206*b* would be marked as "0" in the block indication vector and block 202*c* would be marked as "1" in the block indication vector.

FIG. 5 is a flowchart illustrating an additional example method for processing a data record including encrypted and decrypted data. Specifically, FIG. 5 relates to additional steps for encrypting and/or decrypting the blocks of a data record using the encrypted counter stream and an encryption/decryption algorithm. The operations performed, such as by the apparatus 100 of FIG. 1, in accordance with an example embodiment of the method are illustrated. As shown in block 502 of FIG. 5, the apparatus 100, including the processor 110 and the cryptography circuitry 140 of FIG. 1, may be configured to determine the counter number for the determined ciphertext block from the encrypted counter stream.

As shown in block 504 of FIG. 5, the apparatus 100, including the processor 110 and the cryptography circuitry 140 of FIG. 1, may be configured to decrypt the determined ciphertext block into the decrypted plaintext block by executing an exclusive disjunction (XOR) operation using the determined counter number. For example, as shown in FIG. 2, the XOR operation 206 may receive the ciphertext block 202*d* and a counter number corresponding to the block 202*d* from the encrypted counter stream as shown by operations 226 and 227.

As shown in block 506 of FIG. 5, the apparatus 100, including the processor 110 and the cryptography circuitry 140 of FIG. 1, may be configured to determine the counter number for the determined plaintext block from the encrypted counter stream.

As shown in block 508 of FIG. 5, the apparatus 100, including the processor 110 and the cryptography circuitry 140 of FIG. 1, may be configured to encrypt the determined plaintext block into the encrypted ciphertext block by executing the XOR operation using the determined counter number. For example, as shown in FIG. 2, the XOR operation 206 may receive the plaintext block 202*c* and a counter number corresponding to the block 202*c* from the encrypted counter stream as shown by operations 221 and 222.

FIG. 7 is a flowchart illustrating an additional example method for processing a data record including encrypted and decrypted data. Specifically, FIG. 7 relates to additional steps for encrypting and/or decrypting the blocks of a data record using a cipher block chaining method as additionally illustrated in FIG. 6. For example, the operations performed, such as by the apparatus 100 of FIG. 1, in accordance with an example embodiment of the method are illustrated. As shown in block 702 of FIG. 7, the apparatus 100, including the processor 110 and the cryptography circuitry 140 of FIG. 1, may be configured to process the ciphertext block utilizing a cipher block function. For example, as shown in FIG. 6, an AES cipher block function 616 may receive the sub block 6 of ciphertext block 602*b* and process the block.

As shown in block 704 of FIG. 7, the apparatus 100, including the processor 110 and the cryptography circuitry 140 of FIG. 1, may be configured to decrypt the processed ciphertext block into the decrypted plaintext block by executing an exclusive disjunction (XOR) operation using data from a preceding ciphertext block. For example, as shown in FIG. 6, the XOR operation 610 may receive the processed sub block and the preceding sub block 5 as shown by operations 617 and 618.

As shown in block 706 of FIG. 7, the apparatus 100, including the processor 110 and the cryptography circuitry 140 of FIG. 1, may be configured to process the determined plaintext block by executing the XOR operation using data from a preceding plaintext block. For example, as shown in FIG. 6, the XOR operation 610 may receive the sub block 1 and the preceding sub block 602AA as shown by operations 612 and 613.

As shown in block 708 of FIG. 7, the apparatus 100, including the processor 110 and the cryptography circuitry 140 of FIG. 1, may be configured to encrypt the determined plaintext block into the encrypted ciphertext block by processing the plaintext block utilizing the cipher block function. For example, as shown in FIG. 6, the XOR operation 610 may receive the XOR' ed sub block at operation 614.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for processing a data record including encrypted and decrypted data, the method comprising:
   receiving a data record comprising ciphertext and plaintext blocks;
   determining whether each block in the data record is a ciphertext block or a plaintext block;
   upon determining a block is a ciphertext block:
      storing the determined ciphertext block into a ciphertext record;
      decrypting the determined ciphertext block into a plaintext block utilizing a decryption algorithm; and
      storing the decrypted plaintext block in a plaintext record;
   upon determining a block is a plaintext block:
      storing the determined plaintext block into the plaintext record;
      encrypting the determined plaintext block into a ciphertext block utilizing an encryption algorithm; and storing the encrypted ciphertext block in the ciphertext record;
authenticating the data record by passing each block of the ciphertext record to an authentication scheme; and
outputting the plaintext record to a destination application.

2. The method of claim 1, further comprising:
generating an encrypted counter stream; and
generating a block indication vector including an indication of an encryption status of each block of the data record;
wherein determining whether each block in the data record is a ciphertext block or a plaintext block comprises using the block indication vector to determine if the block is a ciphertext block or a plaintext block.

3. The method of claim 2, wherein decrypting the determined ciphertext block into the decrypted plaintext block utilizing the decryption algorithm comprises:
determining the counter number for the determined ciphertext block; and
decrypting the determined ciphertext block into the decrypted plaintext block by executing an exclusive disjunction (XOR) operation using the determined counter number;
wherein encrypting the determined plaintext block into the encrypted ciphertext block utilizing the encryption algorithm comprises:
determining the counter number for the determined plaintext block; and
encrypting the determined plaintext block into the encrypted ciphertext block by executing the XOR operation using the determined counter number.

4. The method of claim 1, wherein the method comprises a single pass decryption and authentication method.

5. The method of claim 1, wherein the authentication scheme utilizes an Advanced Encryption Standard-Galois/Counter Mode calculation.

6. The method of claim 1, wherein decrypting the determined ciphertext block into a plaintext block utilizing a decryption algorithm comprises:
processing the ciphertext block utilizing a cipher block function;
decrypting the processed ciphertext block into the decrypted plaintext block by executing an exclusive disjunction (XOR) operation using data from a preceding ciphertext block; and
wherein encrypting the determined plaintext block into the encrypted ciphertext block utilizing the encryption algorithm comprises:
processing the determined plaintext block by executing the XOR operation using data from a preceding plaintext block; and
encrypting the determined plaintext block into the encrypted ciphertext block by processing the plaintext block utilizing the cipher block function.

7. The method of claim 1, wherein each block in the data record comprises a single byte or wherein each block in the data record comprises sixteen bytes.

8. An apparatus for decrypting and authenticating a data record including encrypted and decrypted data comprising at least one processor and at least one memory including computer program code, the at least one memory and the computer program code configured to, with the processor, cause the apparatus to at least:
receive a data record comprising ciphertext and plaintext blocks;
determine whether each block in the data record is a ciphertext block or a plaintext block;
upon determining a block is a ciphertext block:
store the determined ciphertext block into a ciphertext record;
decrypt the determined ciphertext block into a plaintext block utilizing a decryption algorithm; and
store the decrypted plaintext block in a plaintext record;
upon determining a block is a plaintext block:
store the determined plaintext block into the plaintext record;
encrypt the determined plaintext block into a ciphertext block utilizing an encryption algorithm; and
store the encrypted ciphertext block in the ciphertext record;
authenticate the data record by passing each block of the ciphertext record to an authentication scheme; and
output the plaintext record to a destination application.

9. The apparatus of claim 8, wherein the at least one memory and the computer program code are further configured to, with the processor, cause the apparatus to at least:
generate an encrypted counter stream; and
generate a block indication vector including an indication of an encryption status of each block of the data record;
wherein to determine whether each block in the partially decrypted data record is a ciphertext block or a plaintext block the at least one memory and the computer program code are further configured to, with the processor, cause the apparatus to at least use the block indication vector to determine if the block is a ciphertext block or a plaintext block.

10. The apparatus of claim 9, wherein to decrypt the determined ciphertext block into the decrypted plaintext block utilizing the decryption algorithm the at least one memory and the computer program code are further configured to, with the processor, cause the apparatus to at least:
determine a counter number for the determined ciphertext block; and
decrypt the determined ciphertext block into the decrypted plaintext block by executing an exclusive disjunction (XOR) operation using the determined counter number;
wherein to encrypt the determined plaintext block into the encrypted ciphertext block utilizing the encryption algorithm the at least one memory and the computer program code are further configured to, with the processor, cause the apparatus to at least:
determine a counter number for the determined plaintext block; and
encrypt the determined plaintext block into the encrypted ciphertext block by executing the XOR operation using the determined counter number.

11. The apparatus of claim 8, wherein to decrypt the determined ciphertext block into the decrypted plaintext block utilizing the decryption algorithm the at least one memory and the computer program code are further configured to, with the processor, cause the apparatus to at least:
process the ciphertext block utilizing a cipher block function;
decrypt the processed ciphertext block into the decrypted plaintext block by executing an exclusive disjunction (XOR) operation using data from a preceding ciphertext block; and
wherein to encrypt the determined plaintext block into the encrypted ciphertext block utilizing the encryption algorithm the at least one memory and the computer program code are further configured to, with the processor, cause the apparatus to at least:
process the determined plaintext block by executing the XOR operation using data from a preceding plaintext block; and
encrypt the determined plaintext block into the encrypted ciphertext block by processing the plaintext block utilizing the cipher block function.

12. The apparatus of claim 8, wherein the apparatus is configured to execute a single pass decryption and authentication method.

13. The apparatus of claim 8, wherein the authentication scheme utilizes an Advanced Encryption Standard-Galois/Counter Mode calculation.

14. The apparatus of claim 8, wherein each block in the data record comprises a single byte or wherein each block in the data record comprises sixteen bytes.

15. A non-transitory computer-readable storage medium for decrypting and authenticating a data record including encrypted and decrypted data, the non-transitory computer-readable storage medium storing program code instructions that, when executed, cause an apparatus to at least:
receive a data record comprising ciphertext and plaintext blocks;
determine whether each block in the data record is a ciphertext block or a plaintext block;
upon determining a block is a ciphertext block:
store the determined ciphertext block into a ciphertext record;
decrypt the determined ciphertext block into a plaintext block utilizing a decryption algorithm; and
store the decrypted plaintext block in a plaintext record;
upon determining a block is a plaintext block:
store the determined plaintext block into the plaintext record;
encrypt the determined plaintext block into a ciphertext block utilizing an encryption algorithm; and
store the encrypted ciphertext block in the ciphertext record;
authenticate the data record by passing each block of the ciphertext record to an authentication scheme; and
output the plaintext record to a destination application.

16. The non-transitory computer-readable storage medium of claim 15, the non-transitory computer-readable storage medium storing further program code instructions that, when executed, cause the apparatus to further:
generate an encrypted counter stream; and
generate a block indication vector including an indication of an encryption status of each block of the data record;
wherein to determine whether each block in the data record is a ciphertext block or a plaintext block, the non-transitory computer-readable storage medium further comprises program code instructions that, when executed, cause the apparatus to further use the block indication vector to determine if the block is a ciphertext block or a plaintext block.

17. The non-transitory computer-readable storage medium of claim 16, wherein to decrypt the determined ciphertext block into the decrypted plaintext block utilizing the decryption algorithm the non-transitory computer-readable storage medium further comprises program code instructions that, when executed, cause the apparatus to further:
determine a counter number for the determined ciphertext block; and
decrypt the determined ciphertext block into the decrypted plaintext block by executing an exclusive disjunction (XOR) operation using the determined counter number;
wherein to encrypt the determined plaintext block into the encrypted ciphertext block utilizing the encryption algorithm the non-transitory computer-readable storage medium further comprises program code instructions that, when executed, cause the apparatus to further:
determine a counter number for the determined plaintext block; and
encrypt the determined plaintext block into the encrypted ciphertext block by executing the XOR operation using the determined counter number.

18. The non-transitory computer-readable storage medium of claim 15, wherein the apparatus is configured to execute a single pass decryption and authentication method.

19. The non-transitory computer-readable storage medium of claim 15, wherein the authentication scheme utilizes an Advanced Encryption Standard-Galois/Counter Mode calculation.

20. The non-transitory computer-readable storage medium of claim 1, wherein to decrypt the determined ciphertext block into the decrypted plaintext block utilizing the decryption algorithm the non-transitory computer-readable storage medium further comprises program code instructions that, when executed, cause the apparatus to further:
process the ciphertext block utilizing a cipher block function;
decrypt the processed ciphertext block into the decrypted plaintext block by executing an exclusive disjunction (XOR) operation using data from a preceding ciphertext block; and
wherein to encrypt the determined plaintext block into the encrypted ciphertext block utilizing the encryption algorithm the non-transitory computer-readable storage medium further comprises program code instructions that, when executed, cause the apparatus to further:
process the determined plaintext block by executing the XOR operation using data from a preceding plaintext block; and
encrypt the determined plaintext block into the encrypted ciphertext block by processing the plaintext block the cipher block function.

\* \* \* \* \*